United States Patent [19]

Buzzi

[11] Patent Number: 5,092,021
[45] Date of Patent: Mar. 3, 1992

[54] INTERMITTENTLY ROTARY WORKPIECE-HOLDING TABLE FOR WORKING AND ASSEMBLY

[75] Inventor: Ugo Buzzi, Arzo, Switzerland

[73] Assignee: Mikron S.A., Agno, Switzerland

[21] Appl. No.: 620,216

[22] Filed: Nov. 30, 1990

[30] Foreign Application Priority Data

Jan. 23, 1990 [CH] Switzerland .......... 193/90-0

[51] Int. Cl.$^5$ .......... B23Q 5/22; B23B 39/20
[52] U.S. Cl. .......... 29/38 C; 29/38 A
[58] Field of Search .......... 29/563, 38 R, 37 R, 29/37 A, 38 A, 38 B, 38 C, 33 P, 33 R, 36

[56] References Cited

U.S. PATENT DOCUMENTS

| | | | |
|---|---|---|---|
| 3,797,081 | 3/1974 | Buzzi | 29/38 C |
| 4,184,236 | 1/1980 | Nutt | 29/38 R |
| 4,313,260 | 2/1982 | Yeo et al. | 29/38 A |
| 4,523,359 | 6/1985 | Gippa | 29/38 A |
| 4,862,569 | 9/1989 | Buzzi | 29/38 C |

FOREIGN PATENT DOCUMENTS

| | | | |
|---|---|---|---|
| 884965 | 11/1981 | U.S.S.R. | 29/38 R |
| 893577 | 1/1982 | U.S.S.R. | 29/36 |
| 1255392 | 9/1986 | U.S.S.R. | 29/38 C |

Primary Examiner—William Briggs
Attorney, Agent, or Firm—Young & Thompson

[57] ABSTRACT

Machine with intermittently rotary workpiece-holding table makes it possible to perform with great rapidity the working and assembly of pieces requiring great precision. It comprises work units placed above (8), below (8') and laterally (8'') to rotary table (14) and respective control elements (7a, 15, 7b, FIGS. 1a and 1b) to determine the advance and return movements of the work units. The control units comprise, for each of the work units placed above (8, FIG. 1), a linear cam (7a) and a reversed linear cam (7b), angularly out of phase, controlling a lever system (15) carrying the corresponding tappet. The cams are placed in the axial direction on a rotating body (6). With respect to known machines that exhibit an active travel and an empty return travel, the hourly production theoretically is doubled.

3 Claims, 4 Drawing Sheets

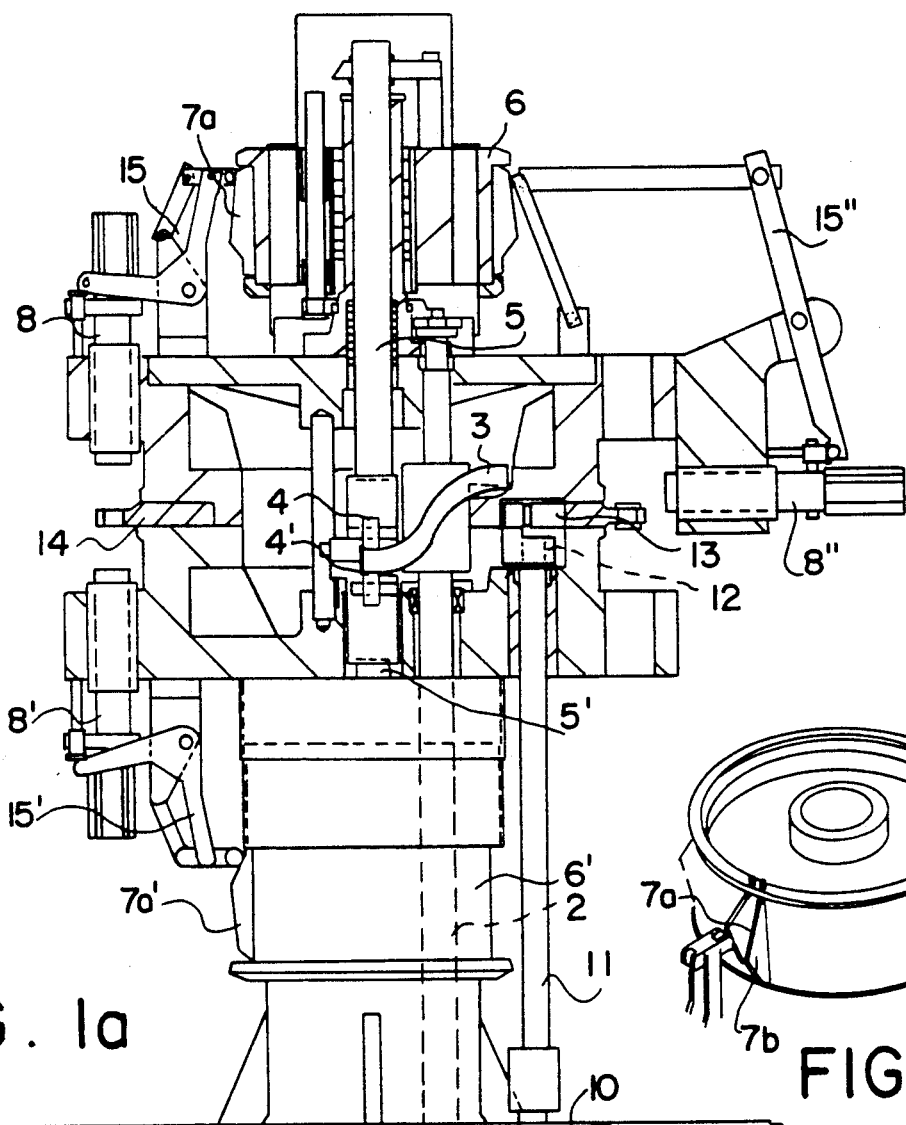
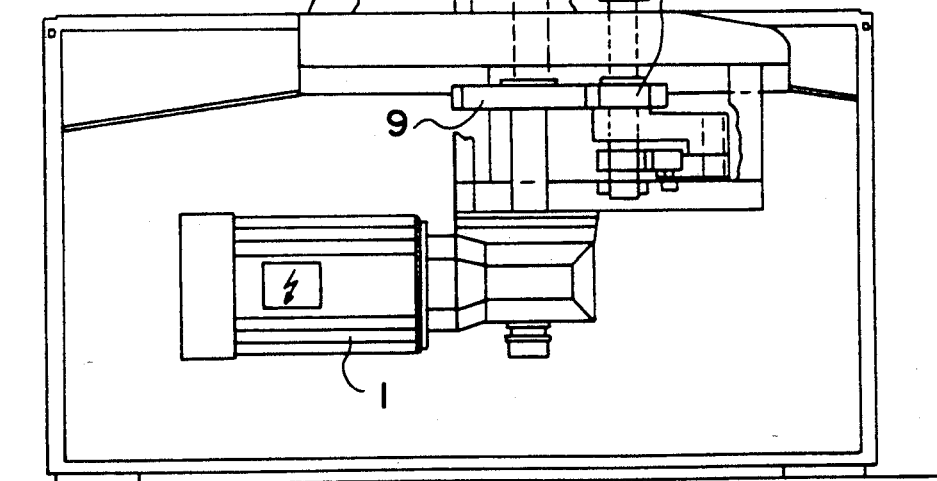
FIG. 1a
FIG. 1b

INTERMITTENTLY ROTARY WORKPIECE-HOLDING TABLE FOR WORKING AND ASSEMBLY

There is known (see European patent No. EP 83 304 issued Mar. 18, 1987) a machine with intermittently rotary workpiece-holding table for performing with great rapidity the working and assembly of pieces requiring high-precision, comprising work units placed above, below and laterally to the rotary table and elements which, during a working cycle, perform an axial movement, transmitting the advance and return movement to the work units by radial linear cams. During idle time, i.e., not used for working, said elements are rotated angularly so that the radial linear cams are not in contact with said work units and in this position the return of the various elements to the initial position occurs.

The disadvantage that the above-described machine exhibits consists in the fact that the central shaft transmits the advance and return movement to the work units during a travel (e.g., movement downward) and during an idle time the shaft must first rotate to see to it that the linear cams are no longer in contact with said units. The return to the initial position occurs in this position. Then the shaft is again rotated so that the linear cams are again in contact with the work units.

It is obvious that the central shaft with the cam-holding elements, having to perform a work travel, rotation of the cam-holding elements, idle return travel and again rotation of the cam-holding elements, to be brought back to the initial position, notably limits the speed of the machine and therefore the hourly production.

To eliminate these drawbacks, the machine according to this invention is designed so that the central shaft transmits the advance and return movement to the operating units, without idle travel of the central shaft and therefore theoretically doubling the hourly production.

The machine according to this invention therefore is characterized by the characterizing part of claim 1.

Therefore it makes it possible to work or assemble a double number of pieces with respect to the known one cited above, with the same precision and the same operating characteristics.

The accompanying drawings represent a preferred nonlimiting and nonbinding embodiment of said machine.

FIG. 1a represents it in front view.

FIG. 1b represents a detail of it.

Figure 2:
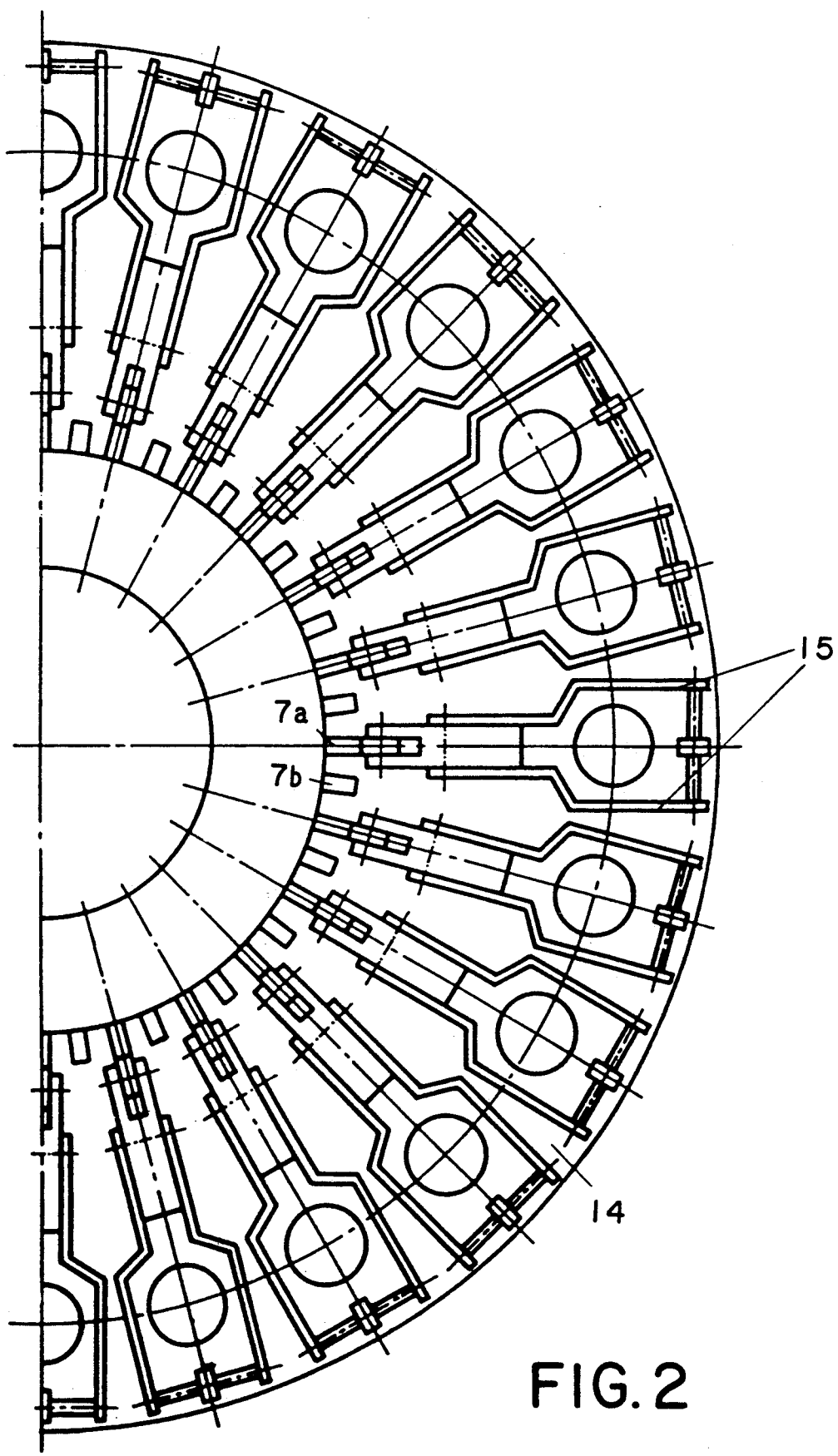

FIG. 2 diagrammatically represents in plan view a half of piece-holding table.

Figure 3:
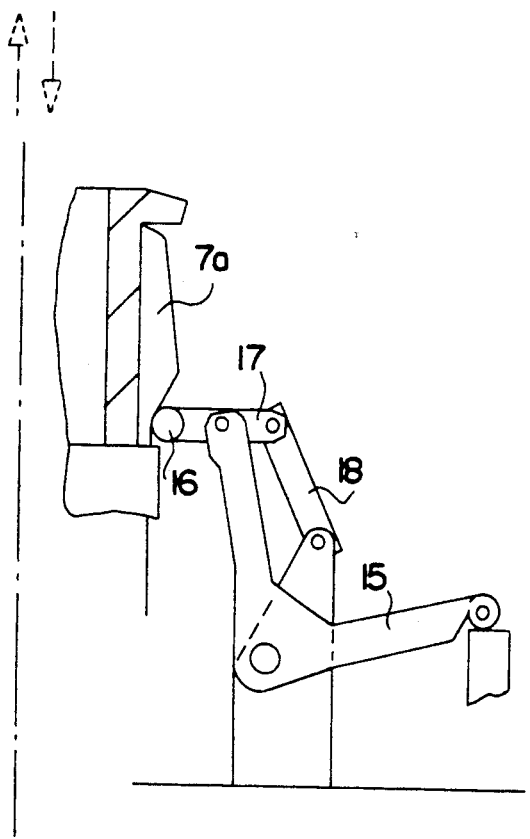

FIG. 3, in front view, the detail of the control levers of the tappet that slides on a linear cam.

Figure 4:
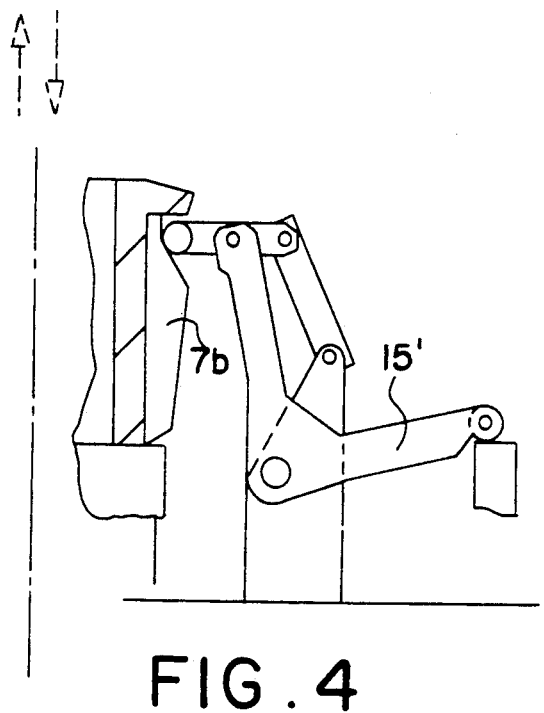
Figures 5A, 5B, 5C, 5D:
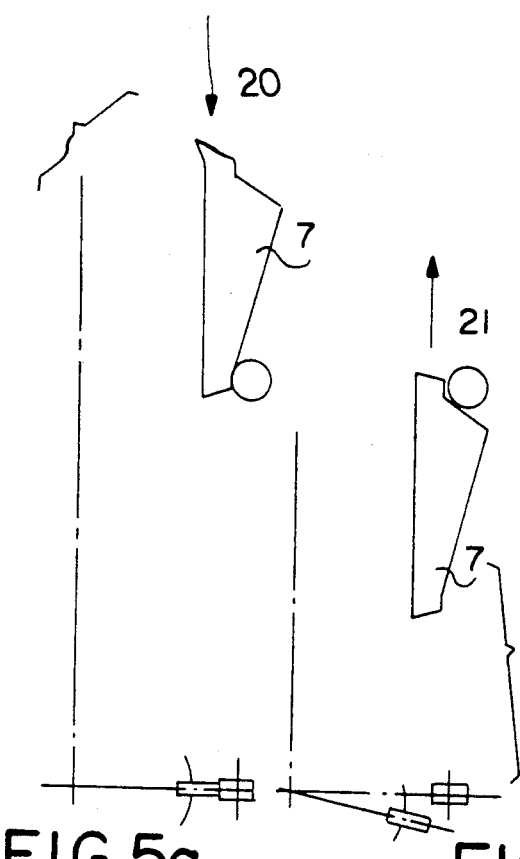
Figures 6A, 6B, 6C, 6D:
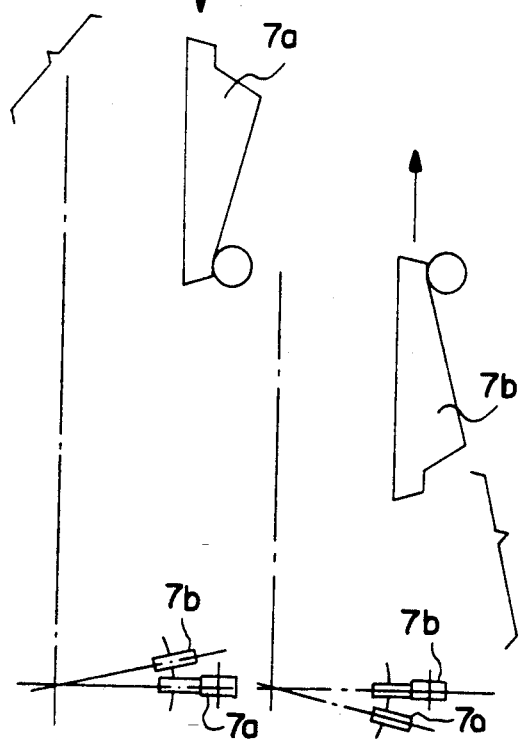

FIG. 4, still in front view, the detail of the control lever systems of the tappet that slides on the linear cam in the opposite direction.

FIGS. 5a, 5b, 5c and 5d represent, to show better the difference between the known machine and that according to the invention, the succession of work or return phases of said known machine (European patent No. 83 304).

FIGS. 6a, 6b, 6c, and 6d represent the succession of work and return phases of the machine according to the invention.

With reference to the drawings:

Motor 1 (FIG. 1) controls main shaft 2 on which helical double cam 3 is fastened. Cam 3 controls, by the tappet with rollers 4, 4', shafts 5, 5', to which are fastened cylindrical bodies 6, 6' to be able to slide axially but free angularly.

To said bodies are fastened opposite linear cams 7a, 7b; 7'a and 7'b (not shown) which control working units 8, 8'. There are two cams for each work unit (7a, 7b for upper work unit 8, 7'a and 7'b (7'b is not represented) for lower work unit 8'.

When cylindrical body 6 rotates, cams 7a, 7b are alternately in contact with lever systems 15, controlling work unit 8 (see FIG. 3 and 4). The same can be said for lower cylindrical body 6' and cams 7'a and 7'b (the latter is not represented).

On shaft 2 (FIG. 1) is fastened a gear 9 which meshes with gear 10.

Gears 9 and 10 have a ratio of 2 to 1.

Gear 10 is integral with shaft 11 which carries Geneva Movement 12, 13 which drives piece-holding table 14.

Since gear 9, 10 have a ratio of 2 to 1, shaft 2 will have a halved angular speed with respect to shaft 11. On the other hand, cam 3 has an opposite front curvilinear profile with respect to the rear one, i.e., the front profile rises with constant increment from 0° to 180°, while the rear one descends, always with constant increment during the remaining degrees (180°—360°).

During the top and bottom dead centers (0°—180°), cylindrical bodies 6,6' are rotated to exhibit alternately linear cams 7a, 7a' to unit control levers 15, 15'. Levers 15, 15' which control the various operating units are designed to avoid the distortions of the movements given by the liner cams both in the case of descending and ascending travel.

Actually, tappet 16, i.e., roller 16 which rests on linear cam 7 (FIG. 3) is fastened to a lever 17, which is pivoted both on lever 15 itself and on auxiliary lever 18.

In this way it is obtained that the point of contact of roller 16, for small angles, as used in practice, remains practically unchanged.

To show better the profound differences between the cited known machine (EP 83 304) and that described according to the present invention, the sequence of the work and return phases (a, b, c, d) of the known machine of European patent EP 83 304 is shown in FIG. 5, while the sequence of the work and return phases (a, b, c, d) of each work unit 8 and 8' of the machine according to the present invention is shown in FIG. 6.

In the known machine (FIG. 5a):

During its descent travel according to arrow 20, linear cam 7 acts on tappet 16 (FIG. 3), driving lever 15, and with it, work unit 8.

The reascending travel according to arrow 21 (FIG. 5b) occurs empty, without performing any useful operation.

The subsequent descent travel (FIG. 5c) is active, i.e., the various elements again act on work unit 8.

the last phase (5d) is again inactive.

In conclusion: only two travels are active, while two are inactive.

In the machine according to the present invention (FIG. 6a, b, c, d), since the profile of cam 7b is identical with that of cam 7a but cam 7b is rotated 180°, i.e., fastened in a way opposite to 7a, all four travels of the cam become active, with doubling of the hourly production with respect to the known machine.

I claim:

1. Machine with intermittently rotary workpiece-holding table for performing with great rapidity the working and assembly of pieces requiring high-precision, comprising work units placed above (8), below (8') and laterally (8") to rotary table (14) and control elements of said work units (15, 15', 15") characterized in that the advance and return of each work unit is controlled by two cams (7a, 7b; 7'a, 7'b), placed side by side and out of phase, identical cams but fastened in an opposite way, i.e., rotated 180° with respect to one another on respective rotating bodies (6, 6'), bodies which are rotated at maximum upper and lower points, so that a cam (7a; 7'a) is in contact with corresponding operating unit (8, 8', 8") during a descending travel and the other cam (7b; 7'b) during the ascending travel.

2. Machine according to claim 1, characterized by a motor (1) controlling an intermediate shaft (2) parallel to main shaft (5) and at an angular speed that is halved with respect to that of secondary shaft (11) controlling, by a Geneva movement (12, 13), pieceholding table (14); a double cam (3) being integral with said intermediate shaft (2), a cam exhibiting two symmetrical profiles, the first gradually increasing from 0° to 180° and the second gradually decreasing from 180° to 360°; each of said profiles working with a tappet (4, 4') which drives its axially sliding cylindrical rotating body (6, 6').

3. Machine according to claim 2, wherein the control elements of said work units (8, 8, 8") comprise lever systems (15, 15', 15") working with said cams (7a, 7b; 7'a, 7'b, etc.); each lever system (15, 15', 15"), which determines the advance or return movement of the respective operating unit, comprising: a main bent lever (15) and an auxiliary lever (17, 18) to which is fastened a roller (16) which acts as a tappet; the unit being mutually pivoted so that the point of contact of roller (16) on the respective linear cam (7a, 7b; 7'a, 7'b) remains unchanged for small angles.

* * * * *